(12) United States Patent
Yan et al.

(10) Patent No.: US 11,317,365 B2
(45) Date of Patent: Apr. 26, 2022

(54) APPARATUSES AND METHODS FOR DETERMINING TIME DELAY

(71) Applicant: Motorola Mobility LLC, Chicago, IL (US)

(72) Inventors: Zhi Yan, Beijing (CN); Haipeng Lei, Beijing (CN); Xiaodong Yu, Beijing (CN); Chenxi Zhu, Beijing (CN)

(73) Assignee: Motorola Mobility LLC, Chicago, IL (US)

( * ) Notice: Subject to any disclaimer, the term of this patent is extended or adjusted under 35 U.S.C. 154(b) by 182 days.

(21) Appl. No.: 16/623,070

(22) PCT Filed: Jun. 16, 2017

(86) PCT No.: PCT/CN2017/088648
§ 371 (c)(1),
(2) Date: Dec. 16, 2019

(87) PCT Pub. No.: WO2018/227552
PCT Pub. Date: Dec. 20, 2018

(65) Prior Publication Data
US 2020/0236635 A1 Jul. 23, 2020

(51) Int. Cl.
*H04J 3/00* (2006.01)
*H04W 56/00* (2009.01)
(Continued)

(52) U.S. Cl.
CPC ......... *H04W 56/001* (2013.01); *H04L 5/0053* (2013.01); *H04L 5/14* (2013.01);
(Continued)

(58) Field of Classification Search
CPC ............. H04W 56/001; H04W 72/042; H04W 72/0413; H04W 74/0006
See application file for complete search history.

(56) References Cited

U.S. PATENT DOCUMENTS

| 2018/0192383 A1* | 7/2018 | Nam ........................ H04J 11/00 |
| 2020/0022175 A1* | 1/2020 | Xiong ............... H04W 72/0453 |

FOREIGN PATENT DOCUMENTS

| CN | 101111048 A | 1/2008 |
| CN | 103873214 A | 6/2014 |
| CN | 105580420 A | 5/2016 |

OTHER PUBLICATIONS

PCT/CN2017/088648, Notification of Transmittal of the International Search Report and the Written Opinion of the International Searching Authority, or the Declaration, dated Jan. 17, 2018, pp. 1-11.

(Continued)

*Primary Examiner* — Bo Hui A Zhu
(74) *Attorney, Agent, or Firm* — Kunzler Bean & Adamson

(57) ABSTRACT

Apparatuses, methods, and systems are disclosed for determining time delay for different physical signal transmission orders in communications. One apparatus (200) includes a processor (202) that determines (402) a time delay set of multiple time delay sets corresponding to a downlink signal and an associated signal based on a duplex mode, a time division duplex configuration, a frame configuration, a subcarrier spacing of the associated signal, a resource unit time of the associated signal, a first indication, or some combination thereof. The apparatus (200) includes a receiver (212) that receives (404) a second indication corresponding to the time delay set. The processor (202) determines (406) a time delay value from the time delay set based on the second indication.

20 Claims, 5 Drawing Sheets

(51) Int. Cl.
*H04L 5/00* (2006.01)
*H04L 5/14* (2006.01)
*H04W 72/04* (2009.01)
*H04W 74/00* (2009.01)

(52) U.S. Cl.
CPC ..... *H04W 72/042* (2013.01); *H04W 72/0413* (2013.01); *H04W 74/006* (2013.01)

(56) References Cited

OTHER PUBLICATIONS

3GPP, "3rd Generation Partnership Project; Technical Specification Group Radio Access Network; Evolved Universal Terrestrial Radio Access (E-UTRA); Physical layer procedures (Release 14)", 3GPP TS 36.213 V14.1.0, Dec. 2016, pp. 1-414.
Mediatek Inc., "Detail on scheduling delay for PDSCH and PUSCH", 3GPP TSG RAN WG1 Meeting #84bis R1-163260, Apr. 11-15, 2016, pp. 1-3.
CMCC, "Discussion on Scheduling Delay with Transmission Gaps", 3GPP TSG RAN WG1 Meeting #85 R1-164877, May 23-27, 2016, pp. 1-3.
Nokia et al., "WF on numbers of repetitions for ACK/NACK", 3GPP TSG RAN WG1 Meeting #84bis R1-163740, Apr. 11-15, 2016, pp. 1-2.
Mediatek, "WF on scheduling delay of NPDSCH and NPUSCH", 3GPP TSG RAN WG1 Meeting #84bis R1-163868, Apr. 11-15, 2016, pp. 1-4.
LG Electronics et al., "WF on UCI remaining issues", 3GPP TSG RAN WG1 #84bis R1-163440, Apr. 11-15, 2016, pp. 1-3.

\* cited by examiner

APPARATUSES AND METHODS FOR DETERMINING TIME DELAY

FIELD

The subject matter disclosed herein relates generally to wireless communications and more particularly relates to determining time delay for different physical signal transmission orders in communications.

BACKGROUND

The following abbreviations are herewith defined, at least some of which are referred to within the following description: Third Generation Partnership Project ("3GPP"), Positive-Acknowledgment ("ACK"), Binary Phase Shift Keying ("BPSK"), Clear Channel Assessment ("CCA"), Cyclic Prefix ("CP"), Cyclical Redundancy Check ("CRC"), Channel State Information ("CSI"), Common Search Space ("CSS"), Discrete Fourier Transform Spread ("DFTS"), Downlink Control Information ("DCI"), Downlink ("DL"), Downlink Pilot Time Slot ("DwPTS"), Enhanced Clear Channel Assessment ("eCCA"), Enhanced Mobile Broadband ("eMBB"), Evolved Node B ("eNB"), European Telecommunications Standards Institute ("ETSI"), Frame Based Equipment ("FBE"), Frequency Division Duplex ("FDD"), Frequency Division Multiple Access ("FDMA"), Guard Period ("GP"), Hybrid Automatic Repeat Request ("HARQ"), Internet-of-Things ("IoT"), Licensed Assisted Access ("LAA"), Load Based Equipment ("LBE"), Listen-Before-Talk ("LBT"), Long Term Evolution ("LTE"), Multiple Access ("MA"), Modulation Coding Scheme ("MCS"), Machine Type Communication ("MTC"), Multiple Input Multiple Output ("MIMO"), Multi User Shared Access ("MUSA"), Narrowband ("NB"), Negative-Acknowledgment ("NACK") or ("NAK"), Next Generation Node B ("gNB"), Non-Orthogonal Multiple Access ("NOMA"), Narrowband PDCCH ("NPDCCH"), Narrowband PDSCH ("NPDSCH"), Narrowband PUSCH ("NPUSCH"), Orthogonal Frequency Division Multiplexing ("OFDM"), Primary Cell ("PCell"), Physical Broadcast Channel ("PBCH"), Physical Downlink Control Channel ("PDCCH"), Physical Downlink Shared Channel ("PDSCH"), Pattern Division Multiple Access ("PDMA"), Physical Hybrid ARQ Indicator Channel ("PHICH"), Physical Random Access Channel ("PRACH"), Physical Resource Block ("PRB"), Physical Uplink Control Channel ("PUCCH"), Physical Uplink Shared Channel ("PUSCH"), Quality of Service ("QoS"), Quadrature Phase Shift Keying ("QPSK"), Radio Resource Control ("RRC"), Random Access Procedure ("RACH"), Random Access Response ("RAR"), Radio Network Temporary Identifier ("RNTI"), Reference Signal ("RS"), Resource Spread Multiple Access ("RSMA"), Round Trip Time ("RTT"), Receive ("RX"), Sparse Code Multiple Access ("SCMA"), Scheduling Request ("SR"), Single Carrier Frequency Division Multiple Access ("SC-FDMA"), Secondary Cell ("SCell"), Shared Channel ("SCH"), Signal-to-Interference-Plus-Noise Ratio ("SINR"), System Information Block ("SIB"), Transport Block ("TB"), Transport Block Size ("TBS"), Time-Division Duplex ("TDD"), Time Division Multiplex ("TDM"), Transmission Time Interval ("TTI"), Transmit ("TX"), Uplink Control Information ("UCI"), User Entity/Equipment (Mobile Terminal) ("UE"), Uplink ("UL"), Universal Mobile Telecommunications System ("UMTS"), Uplink Pilot Time Slot ("UpPTS"), Ultra-reliability and Low-latency Communications ("URLLC"), and Worldwide Interoperability for Microwave Access ("WiMAX"). As used herein, "HARQ-ACK" may represent collectively the Positive Acknowledge ("ACK") and the Negative Acknowledge ("NACK"). ACK means that a TB is correctly received while NACK (or NAK) means a TB is erroneously received.

In certain wireless communications networks, a time delay for different physical signal transmissions may be used and different physical signals may follow certain transmission orders and sequences. In such configurations, it may be challenging to determine a time delay and make the system work for these different physical signals.

BRIEF SUMMARY

Apparatuses for determining time delay for different physical signal transmission orders in communications are disclosed. Methods and systems also perform the functions of the apparatus. In one embodiment, the apparatus includes a processor that determines a time delay set of multiple time delay sets corresponding to a downlink signal and an associated signal based on a duplex mode, a time division duplex configuration, a frame configuration, a subcarrier spacing of the associated signal, a resource unit time of the associated signal, a first indication, or some combination thereof. In some embodiments, the apparatus includes a receiver that receives a second indication corresponding to the time delay set. In such embodiments, the processor determines a time delay value from the time delay set based on the second indication.

In one embodiment, the downlink signal is a downlink control signal and the associated signal is a downlink data signal. In a further embodiment, the receiver receives the downlink control signal and receives the downlink data signal based on the time delay value. In certain embodiments, the downlink signal is a downlink control signal and the associated signal is an uplink data signal. In various embodiments, the apparatus includes a transmitter. In such embodiments, the receiver receives the downlink control signal and the transmitter transmits the uplink data signal based on the time delay value. In some embodiments, the downlink signal is a downlink data signal and the associated signal is a feedback signal response to the downlink data signal.

In certain embodiments, the apparatus includes a transmitter. In such embodiments, the receiver receives the downlink data signal and the transmitter transmits the feedback signal based on the time delay value. In some embodiments, the multiple time delay sets are configured by radio resource control signaling. In various embodiments, the multiple time delay sets are predefined by a specification. In one embodiment, the multiple time delay sets are generated based on a base time delay set. In certain embodiments, the first indication explicitly indicates the time delay set from the multiple time delay sets. In some embodiments, the second indication indicates the time delay value of the time delay set.

A method for determining a time delay set, in one embodiment, includes determining a time delay set of multiple time delay sets corresponding to a downlink signal and an associated signal based on a duplex mode, a time division duplex configuration, a frame configuration, a subcarrier spacing of the associated signal, a resource unit time of the associated signal, a first indication, or some combination thereof. In some embodiments, the method includes receiving a second indication corresponding to the time delay set.

In certain embodiments, the method includes determining a time delay value from the time delay set based on the second indication.

In one embodiment, an apparatus for determining a time delay set includes a processor that determines a time delay set of multiple time delay sets corresponding to a downlink signal and an associated signal based on a duplex mode, a time division duplex configuration, a frame configuration, a subcarrier spacing of the associated signal, a resource unit time of the associated signal, a first indication, or some combination thereof. In some embodiments, the apparatus includes a transmitter that transmits a second indication corresponding to the time delay set. In such embodiments, the processor determines a time delay value from the time delay set based on the second indication.

In one embodiment, the downlink signal is a downlink control signal and the associated signal is a downlink data signal. In a further embodiment, the transmitter transmits the downlink control signal and transmits the downlink data signal based on the time delay value. In certain embodiments, the downlink signal is a downlink control signal and the associated signal is an uplink data signal. In various embodiments, the apparatus includes a receiver. In such embodiments, the transmitter transmits the downlink control signal and the receiver receives the uplink data signal based on the time delay value. In some embodiments, the downlink signal is a downlink data signal and the associated signal is a feedback signal response to the downlink data signal.

In certain embodiments, the apparatus includes a receiver. In such embodiments, the transmitter transmits the downlink data signal and the receiver receives the feedback signal based on the time delay value. In some embodiments, the multiple time delay sets are configured by radio resource control signaling. In various embodiments, the multiple time delay sets are predefined by a specification.

In one embodiment, the multiple time delay sets are generated based on a base time delay set. In certain embodiments, the first indication explicitly indicates the time delay set from the multiple time delay sets. In some embodiments, the second indication indicates the time delay value of the time delay set.

A method for determining a time delay set, in one embodiment, includes determining a time delay set of multiple time delay sets corresponding to a downlink signal and an associated signal based on a duplex mode, a time division duplex configuration, a frame configuration, a subcarrier spacing of the associated signal, a resource unit time of the associated signal, a first indication, or some combination thereof. In certain embodiments, the method includes transmitting a second indication corresponding to the time delay set. In some embodiments, the method includes determining a time delay value from the time delay set based on the second indication.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
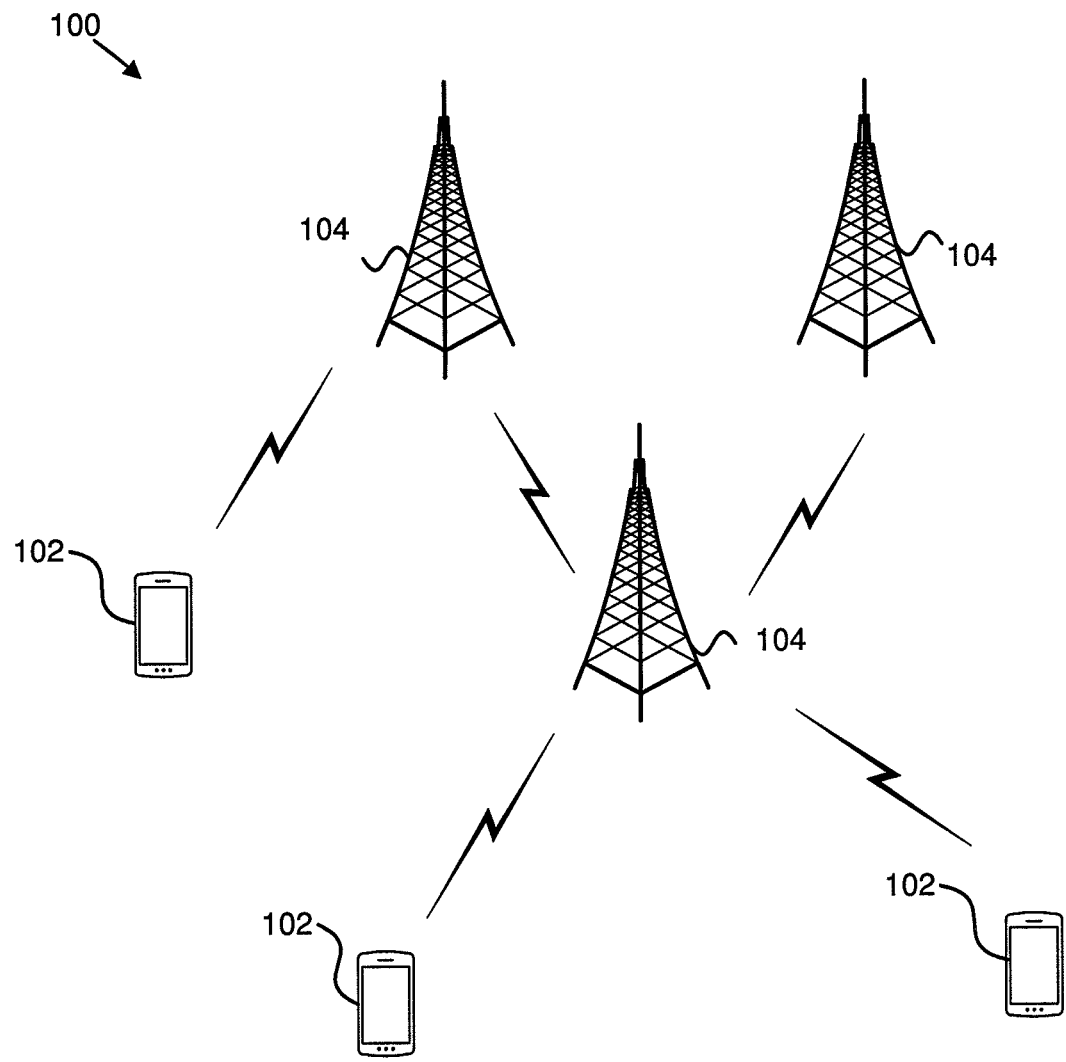
FIG. 1 is a schematic block diagram illustrating one embodiment of a wireless communication system for determining time delay for different physical signal transmission orders in communications.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for determining time delay for different physical signal transmission orders in communications. In one embodiment, the wireless communication system 100 includes remote units 102 and base units 104. Even though a specific number of remote units 102 and base units 104 are depicted in FIG. 1, one of skill in the art will recognize that any number of remote units 102 and base units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the base units 104 via UL communication signals.

The base units 104 may be distributed over a geographic region. In certain embodiments, a base unit 104 may also be referred to as an access point, an access terminal, a base, a base station, a Node-B, an eNB, a gNB, a Home Node-B, a relay node, a device, or by any other terminology used in the art. The base units 104 are generally part of a radio access network that includes one or more controllers communicably coupled to one or more corresponding base units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with the 3GPP protocol, wherein the base unit 104 transmits using an OFDM modulation scheme on the DL and the remote units 102 transmit on the UL using a SC-FDMA scheme or an OFDM scheme. More generally, however, the wireless communication system 100 may implement some other open or proprietary communication protocol, for example, WiMAX, among other protocols. The present disclosure is not intended to be limited to the implementation of any particular wireless communication system architecture or protocol.

The base units 104 may serve a number of remote units 102 within a serving area, for example, a cell or a cell sector via a wireless communication link. The base units 104 transmit DL communication signals to serve the remote units 102 in the time, frequency, and/or spatial domain.

In one embodiment, a remote unit 102 may determine a time delay set of multiple time delay sets corresponding to a downlink signal and an associated signal based on a duplex mode, a time division duplex configuration, a frame configuration, a subcarrier spacing of the associated signal, a resource unit time of the associated signal, a first indication, or some combination thereof. In some embodiments, the remote unit 102 may receive a second indication corresponding to the time delay set. In certain embodiments, the remote unit 102 may determine a time delay value from the time delay set based on the second indication. Accordingly, a remote unit 102 may be used for determining time delay for different physical signal transmission orders in communications.

In certain embodiments, a base unit 104 may determine a time delay set of multiple time delay sets corresponding to a downlink signal and an associated signal based on a duplex mode, a time division duplex configuration, a frame configuration, a subcarrier spacing of the associated signal, a resource unit time of the associated signal, a first indication, or some combination thereof. In certain embodiments, the base unit 104 may transmit a second indication corresponding to the time delay set. In some embodiments, the base unit 104 may determine a time delay value from the time delay set based on the second indication. Accordingly, a base unit 104 may be used for determining time delay for different physical signal transmission orders in communications.

Figure 2:
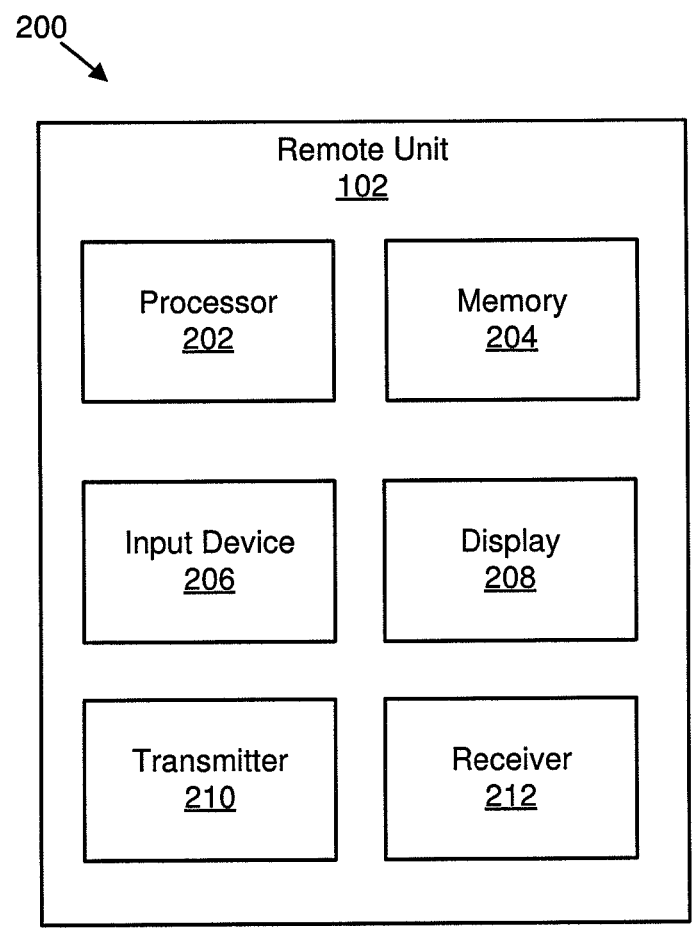
FIG. 2 is a schematic block diagram illustrating one embodiment of an apparatus that may be used for determining time delay for different physical signal transmission orders in communications.

FIG. 2 depicts one embodiment of an apparatus 200 that may be used for determining time delay for different physical signal transmission orders in communications. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. In certain embodiments, the processor 202 may determine a time delay set of multiple time delay sets corresponding to a downlink signal and an associated signal based on a duplex mode, a time division duplex configuration, a frame configuration, a subcarrier spacing of the associated signal, a resource unit time of the associated signal, and/or a first indication. In some embodiments, the first indication may be an explicit indication that identifies the time delay set. In various embodiments, the processor 202 may determine a time delay value from the time delay set based on a second indication. In one embodiment, the second indication may be an explicit indication that identifies the time delay value. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 stores data relating to determining a time delay set. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the base unit 104 and the receiver 212 is used to receive DL communication signals from the base unit 104. In certain embodiments, the receiver 212 may be used to receive a first and/or a second indication corresponding to a time delay set. Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
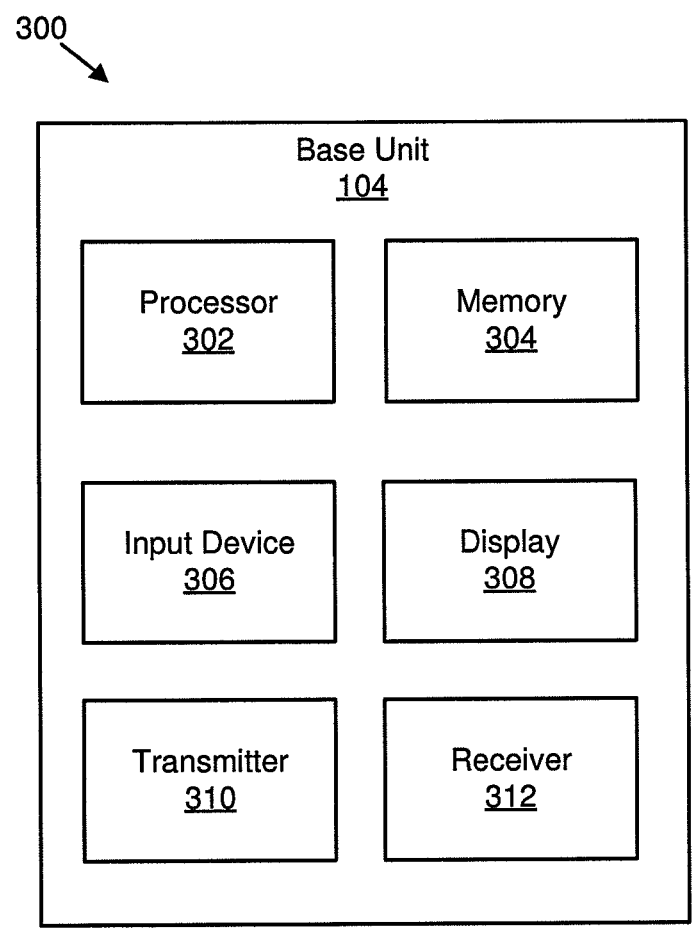
FIG. 3 is a schematic block diagram illustrating one embodiment of an apparatus that may be used for determining time delay for different physical signal transmission orders in communications.

FIG. 3 depicts one embodiment of an apparatus 300 that may be used for determining time delay for different physical signal transmission orders in communications. The apparatus 300 includes one embodiment of the base unit 104. Furthermore, the base unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In one embodiment, the processor 302 may be used to determine a time delay set of multiple time delay sets corresponding to a downlink signal and an associated signal based on a duplex mode, a time division duplex configuration, a frame configuration, a subcarrier spacing of the associated signal, a resource unit time of the associated signal, and/or a first indication. In certain embodiments, the transmitter 310 may be used to transmit a first indication and/or a second indication corresponding to the time delay set. In various embodiments, the processor 302 may be used to determine a time delay value from the time delay set based on the second indication. Although only one transmitter 310 and one receiver 312 are illustrated, the base unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

In some embodiments, determining a time delay set may be performed using various steps that may be performed in any suitable order and/or some steps may not be performed.

In a first step, a base unit 104 may configure (e.g., preconfigure) multiple time delay sets to a remote unit 102 for each of one or more of the following cases: multiple time delay sets corresponding to PDCCH and an associated PDSCH transmission, multiple time delay sets corresponding to PDCCH and an associated PUSCH transmission, and multiple time delay sets corresponding to PDSCH and an associated ACK/NACK transmission. In certain embodiments, a unit of time delay in the time delay sets may be a subframe (e.g., 1 ms) for a 3GPP LTE system and/or a NB-slot (e.g., 2 ms) for a 3GPP NB-IoT system. In some embodiments, if the unit of time delay in the time delay set is a subframe (e.g., 1 ms) for 3GPP LTE system, only valid transmission subframes may count as part of a delay subframe or all absolute subframes may count as part of a delay subframe. In various embodiments, the multiple time delay sets may be configured by RRC signaling or may be predefined in a specification. In one embodiment, the multiple time delay sets may be generated based on a base time delay set using different weight values.

In a second step, the base unit 104 and the remote unit 102 may determine one time delay set of the multiple time delay sets based on one or more of following factors: Rmax (e.g., a maximum number of PDCCH repetition transmissions), a duplex mode (e.g., FDD or TDD), a TDD configuration (e.g., TDD DL/UL configuration), a frame configuration (e.g., valid subframe configuration that may be indicated by RRC signaling or fixed in a specification and may indicate which subframe may be used for an uplink and/or downlink data transmission), a subcarrier spacing (e.g., an uplink and/or downlink data transmission subcarrier spacing), a resource unit time (e.g., basic downlink and/or uplink transmission resource unit time duration, 1 ms or 2 ms), and an explicit indication of a time delay set transmitted from the base unit 104 and indicated to the remote unit 102.

In a third step, the base unit 104 may determine and/or indicate a value in a used timing delay set as the timing delay that is used.

In one embodiment, a time delay may be for a PDCCH and an associated PDSCH and may be implicitly indicated. The time delay (e.g., time duration gap) between the end of the PDCCH (e.g., NPDCCH) and the start of the associated PDSCH (e.g., NPDSCH) may equal k delay valid downlink subframes+4 ms. The k may be determined by a time delay set. In certain embodiments, a valid downlink subframe is a subframe configured for PDSCH transmission and does not include a subframe which is a downlink multimedia broadcast subframe number ("MBSFN") subframe or a downlink measurement subframe. In some embodiments, the used time delay set may be implicitly determined by the Rmax and TDD configuration among four time delay sets, and the four time delay sets may be signaled by RRC signaling or fixed by a specification. The time delay sets may be determined as: if Rmax<128 and TDD configuration=0 then the used time delay set={0, 2, 4, 6, 8, 16, 32, 64}; if Rmax<128 and TDD configuration=4 then the used time delay set={0, 4, 8, 12, 16, 32, 64, 128}; if Rmax>=128 and TDD configuration=0 then the used time delay set={0, 8, 16, 32, 64, 128, 256, 512}; and if Rmax>=128 and TDD configuration=4 then the used timing delay set={0, 16, 32, 64, 128, 256, 512, 1024}. In certain embodiments, a used time delay weight may be implicitly determined by the Rmax and TDD configuration among four time delay weights, and the four time delay weights and one base time delay set {0, 1, 2, 3, 4, 8, 16, 32} may be signaled by RRC signaling or fixed by a specification. For example, if Rmax<128 and TDD configuration=0 then the used timing delay weight=2 and accordingly a used time delay set={0, 2, 4, 6, 8, 16, 32, 64}; if Rmax<128 and TDD configuration=4 then the used timing delay weight=4 and accordingly a used time delay set={0, 4, 8, 12, 16, 32, 64, 128}; if Rmax>=128 and TDD configuration=0 then the used timing delay weight=8 and accordingly a used time delay set={0, 8, 16, 24, 32, 64, 128, 256}; and if Rmax>=128 and TDD configuration=4 then a used timing delay weight=16 and accordingly a used time delay set={0, 16, 32, 48, 64, 128, 256, 512}. In various embodiments, the base unit 104 indicates one of the values in the used delay timing set as the k delay valid downlink subframe.

In another embodiment, a time delay may be for a PDCCH and an associated PDSCH and may be explicitly indicated. The time delay (e.g., time duration gap) between the end of the PDCCH (e.g., NPDCCH) and the start of the associated PDSCH (e.g., NPDSCH) may equal k delay valid downlink subframes+4 ms. The k may be determined by a time delay set. In certain embodiments, a valid downlink subframe is a subframe configured for PDSCH transmission and does not include a subframe which is a downlink MBSFN subframe or a downlink measurement subframe. In various embodiments, four fixed time delay sets may be preconfigured by RRC signaling or predefined in specification as: set 1={0, 2, 4, 6, 8, 16, 32, 64}; set 2={0, 4, 8, 12, 16, 32, 64, 128}; set 3={0, 8, 16, 32, 64, 128, 256, 512}; and set 4={0, 16, 32, 64, 128, 256, 512, 1024}. In certain embodiments, the base unit 104 may explicitly indicate one of the four sets to the remote unit 102 for a used delay timing set by RRC signaling or downlink control information, and the base unit 104 may further indicate one of the values in the used delay timing set as the k delay valid DL subframe by RRC signaling or downlink control information. In some embodiments, the base unit 104 determines one of the above sets based on a TDD configuration, a base unit 104 scheduling status, a maximal repetition number, and/or a process delay consideration.

In a further embodiment, a time delay may be for a PDCCH and an associated PUSCH. In such an embodiment, there may be a scheduling delay of the PUSCH (e.g., NPUSCH). The time delay (e.g., time duration gap) between the end of the PDCCH (e.g., NPDCCH) and the start of the associated PDSCH (e.g., NPUSCH) may equals the first l valid uplink subframe/NB-slot after a delay of k absolute number of subframes. The k may be determined by a time delay set. The l may be determined by another time delay set. In certain embodiments, a valid uplink subframe is a subframe configured for PUSCH transmission and does not include a subframe which is an uplink gap subframe. In various embodiments, an absolute number of subframes includes subframes regardless of whether the subframe is valid or invalid. In one embodiment, a fixed set of delay for different TDD configurations and NPUSCH subcarrier spacing is as follows: for a TDD configuration=0 and PUSCH sc=15 kHz then a used timing delay set 1 (for k)={5, 10, 20, 40} and a used timing delay set 2 (for l)={1, 3}; for a TDD configuration=0 and PUSCH sc=3.75 kHz then a used timing delay set 1={5, 10, 15, 20, 25, 30, 35, 40} and a used timing delay set 2={1}; for a TDD configuration=4 and PUSCH sc=15 kHz then a used timing delay set 1={10, 20, 30, 40} and a used timing delay set 2={1, 2}; and for a TDD configuration=4 and PUSCH sc=3.75 kHz then a used timing delay set 1={10, 20, 30, 40, 50, 60, 70, 80} and a used timing delay set 2={1}. In certain embodiment, the base unit 104 may indicate one of the values in the used delay timing set 1 as the k absolute number of subframes delay and used delay timing set 2 as the l valid uplink transmission delay. In some embodiments, considering all DL and UL are valid subframes for NB-IoT and: the TDD configuration is 0 then there are 6 valid UL subframes in a 10 ms period, if sc=3.75 KHz, then the 3rd and 6th UL subframes within the 10 ms frame are not suitable for starting NB-slot transmission and, if sc=15 KHz, then all UL subframes are suitable for the PUSCH transmission; or the TDD configuration is 4 then there are only 2 valid UL in 10 ms period, if sc=3.75 KHz, then only the first UL subframe within the 10 ms frame is suitable for starting NB-slot transmission and, if sc=15 KHz, then all UL subframes are suitable for the PUSCH transmission.

In another embodiment, a time delay may be for a PDCCH and an associated PUSCH and may be implicitly indicated. The time delay (e.g., time duration gap) between the end of the PDCCH (e.g., NPDCCH) and the start of the associated PDSCH (e.g., NPUSCH) may equal k delay valid uplink subframes. The k may be determined by a time delay set. In certain embodiments, a valid uplink subframe is a subframe configured for PUSCH transmission and does not include a subframe which is an uplink gap subframe. In some embodiments, the used time delay set may be implicitly determined by a basic uplink transmission resource unit time duration among two time delay sets, and the two time delay sets may be signaled by RRC signaling or fixed by a specification. For example, if a basic uplink transmission resource unit time is 1 ms then a used timing delay set={0, 2, 4, 6, 8, 16, 32, 64}; and if a basic uplink transmission resource unit time is 2 ms then a used timing delay set={0, 4, 8, 12, 16, 32, 64, 128}. In various embodiments, the base unit 104 indicates one of the values in the used delay timing set as the k delay valid uplink subframe.

Figure 4:
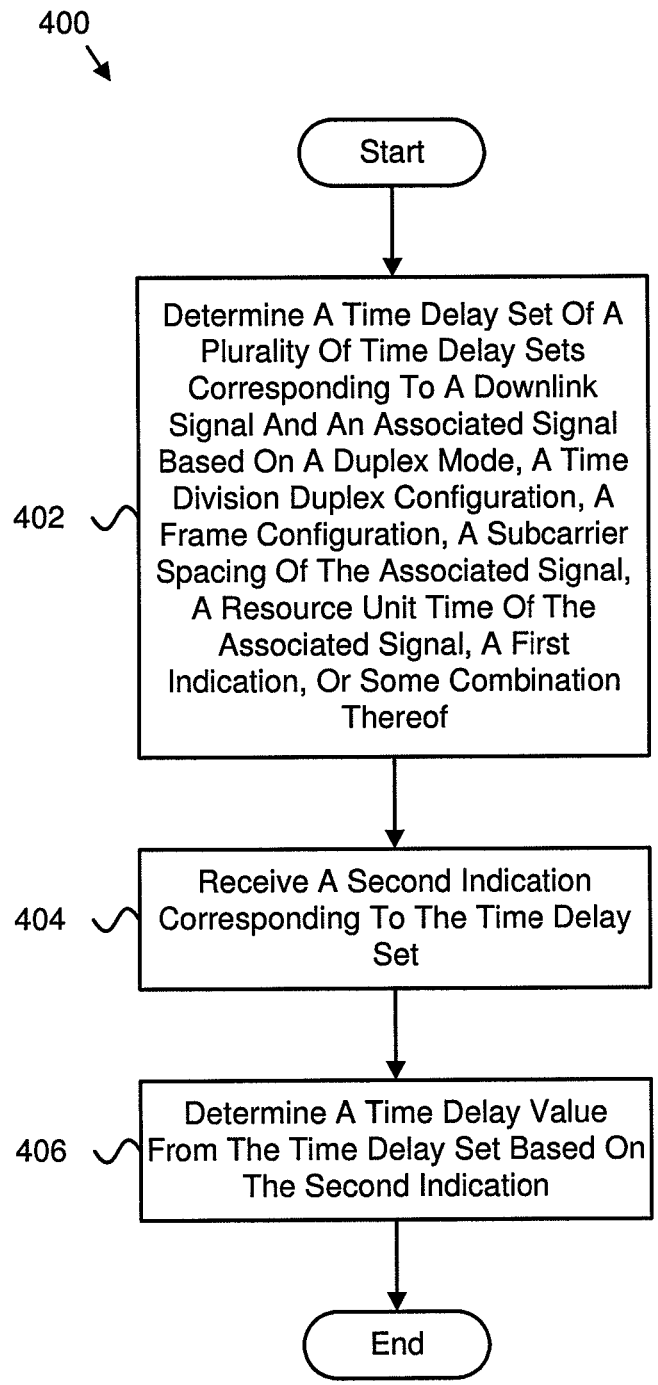
FIG. 4 is a schematic flow chart diagram illustrating one embodiment of a method for determining time delay for different physical signal transmission orders in communications.

FIG. 4 is a schematic flow chart diagram illustrating one embodiment of a method 400 for determining time delay for different physical signal transmission orders in communications. In some embodiments, the method 400 is performed by an apparatus, such as the remote unit 102. In certain embodiments, the method 400 may be performed by a processor executing program code, for example, a microcontroller, a microprocessor, a CPU, a GPU, an auxiliary processing unit, a FPGA, or the like.

The method 400 may include determining 402 a time delay set of multiple time delay sets corresponding to a downlink signal and an associated signal based on a duplex mode, a time division duplex configuration, a frame configuration, a subcarrier spacing of the associated signal, a resource unit time of the associated signal, a first indication, or some combination thereof. In some embodiments, the method 400 includes receiving 404 a second indication corresponding to the time delay set. In certain embodiments, the method 400 includes determining 406 a time delay value from the time delay set based on the second indication.

In one embodiment, the downlink signal is a downlink control signal and the associated signal is a downlink data signal. In a further embodiment, the method 400 includes receiving the downlink control signal and receiving the downlink data signal based on the time delay value. In certain embodiments, the downlink signal is a downlink control signal and the associated signal is an uplink data signal. In various embodiments, the method 400 includes receiving the downlink control signal and transmitting the uplink data signal based on the time delay value. In some embodiments, the downlink signal is a downlink data signal and the associated signal is a feedback signal response to the downlink data signal.

In certain embodiments, the method 400 includes receiving the downlink data signal and transmitting the feedback signal based on the time delay value. In some embodiments, the multiple time delay sets are configured by radio resource control signaling. In various embodiments, the multiple time delay sets are predefined by a specification. In one embodiment, the multiple time delay sets are generated based on a base time delay set. In certain embodiments, the first indication explicitly indicates the time delay set from the multiple time delay sets. In some embodiments, the second indication indicates the time delay value of the time delay set.

Figure 5:
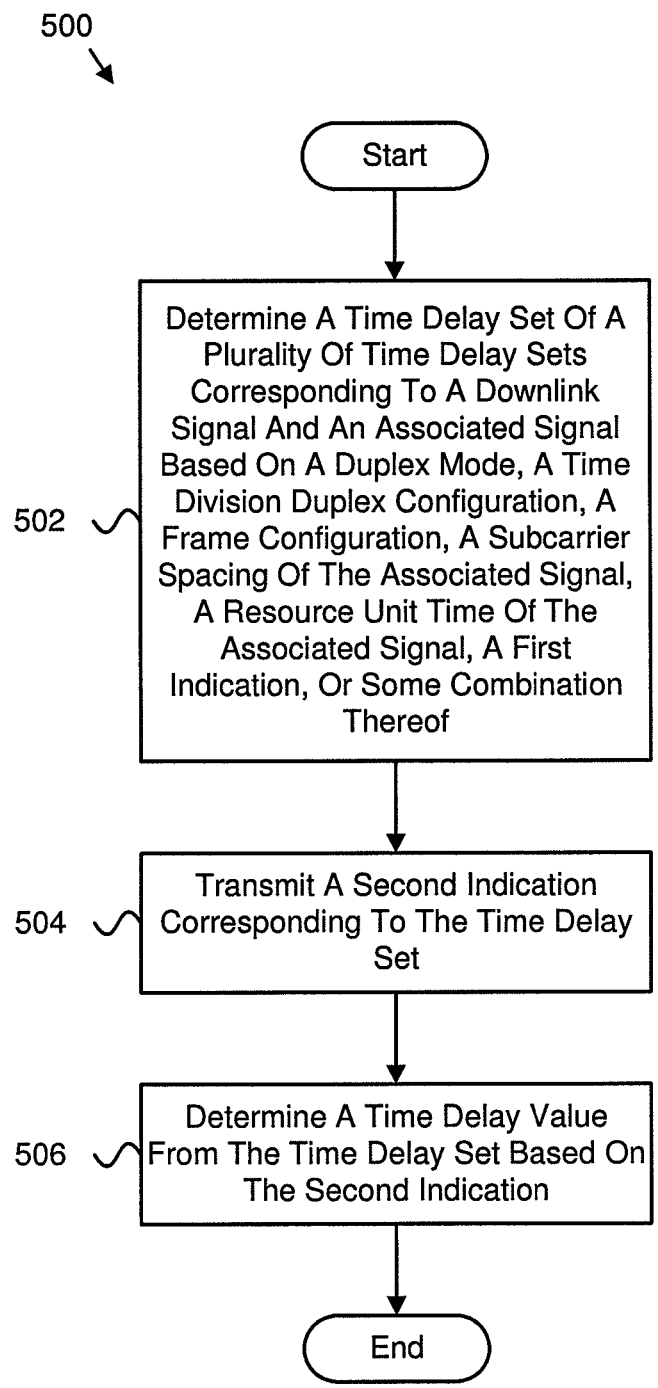
FIG. 5 is a schematic flow chart diagram illustrating another embodiment of a method for determining time delay for different physical signal transmission orders in communications.

FIG. 5 is a schematic flow chart diagram illustrating one embodiment of a method 500 for determining time delay for different physical signal transmission orders in communications. In some embodiments, the method 500 is performed by an apparatus, such as the base unit 104. In certain embodiments, the method 500 may be performed by a processor executing program code, for example, a microcontroller, a microprocessor, a CPU, a GPU, an auxiliary processing unit, a FPGA, or the like.

The method 500 may include determining 502 a time delay set of multiple time delay sets corresponding to a downlink signal and an associated signal based on a duplex mode, a time division duplex configuration, a frame configuration, a subcarrier spacing of the associated signal, a resource unit time of the associated signal, a first indication, or some combination thereof. In certain embodiments, the method 500 includes transmitting 504 a second indication corresponding to the time delay set. In some embodiments, the method 500 includes determining 506 a time delay value from the time delay set based on the second indication.

In one embodiment, the downlink signal is a downlink control signal and the associated signal is a downlink data signal. In a further embodiment, the method 500 includes transmitting the downlink control signal and transmitting the downlink data signal based on the time delay value. In certain embodiments, the downlink signal is a downlink control signal and the associated signal is an uplink data signal. In various embodiments, the method 500 includes transmitting the downlink control signal and receiving the uplink data signal based on the time delay value. In some embodiments, the downlink signal is a downlink data signal and the associated signal is a feedback signal response to the downlink data signal.

In certain embodiments, the method 500 includes transmitting the downlink data signal and receiving the feedback signal based on the time delay value. In some embodiments, the multiple time delay sets are configured by radio resource control signaling. In various embodiments, the multiple time delay sets are predefined by a specification.

In one embodiment, the multiple time delay sets are generated based on a base time delay set. In certain embodiments, the first indication explicitly indicates the time delay set from the multiple time delay sets. In some embodiments, the second indication indicates the time delay value of the time delay set.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An apparatus comprising a user equipment, the apparatus further comprising:
   a processor that:
      configures and stores a plurality of time delay sets at the user equipment, wherein each time delay set of the plurality of time delay sets comprises a plurality of time delay values, and each time delay value of the plurality of time delay values is a time delay between a downlink signal and an associated signal;
      determines a time delay set of the plurality of time delay sets to use for the downlink signal and the associated signal based on a duplex mode, a time division duplex configuration, a frame configuration, a subcarrier spacing of the associated signal, a resource unit time of the associated signal, a first indication, or some combination thereof; and
   a receiver that receives a second indication corresponding to the time delay set, wherein the processor determines a time delay value from within the determined time delay set based on the second indication.

2. The apparatus of claim 1, wherein the downlink signal is a downlink control signal and the associated signal is a downlink data signal.

3. The apparatus of claim 2, wherein the receiver receives the downlink control signal and receives the downlink data signal based on the time delay value.

4. The apparatus of claim 1, wherein the downlink signal is a downlink control signal and the associated signal is an uplink data signal.

5. The apparatus of claim 4, further comprising a transmitter, wherein the receiver receives the downlink control signal and the transmitter transmits the uplink data signal based on the time delay value.

6. The apparatus of claim 1, wherein the downlink signal is a downlink data signal and the associated signal is a feedback signal response to the downlink data signal.

7. The apparatus of claim 6, further comprising a transmitter, wherein the receiver receives the downlink data signal and the transmitter transmits the feedback signal based on the time delay value.

8. The apparatus of claim 1, wherein the plurality of time delay sets is configured by radio resource control signaling.

9. The apparatus of claim 1, wherein the plurality of time delay sets is configured by a specification.

10. The apparatus of claim 1, wherein the plurality of time delay sets is generated based on a base time delay set.

11. The apparatus of claim 1, wherein the first indication explicitly indicates the time delay set from the plurality of time delay sets.

12. The apparatus of claim 1, wherein the second indication indicates the time delay value of the time delay set.

13. A method of a user equipment, the method comprising:
configuring and storing a plurality of time delay sets at the user equipment, wherein each time delay set of the plurality of time delay sets comprises a plurality of time delay values, and each time delay value of the plurality of time delay values is a time delay between a downlink signal and an associated signal;
determining a time delay set of the plurality of time delay sets to use corresponding to for the downlink signal and the associated signal based on a duplex mode, a time division duplex configuration, a frame configuration, a subcarrier spacing of the associated signal, a resource unit time of the associated signal, a first indication, or some combination thereof;
receiving a second indication corresponding to the time delay set; and
determining a time delay value from within the determined time delay set based on the second indication.

14. An apparatus comprising a network device, the apparatus further comprising:
a processor that:
configures and stores a plurality of time delay sets at the network device, wherein each time delay set of the plurality of time delay sets comprises a plurality of time delay values, and each time delay value of the plurality of time delay values is a time delay between a downlink signal and an associated signal;
determines a time delay set of the plurality of time delay sets to use for the downlink signal and the associated signal based on a duplex mode, a time division duplex configuration, a frame configuration, a subcarrier spacing of the associated signal, a resource unit time of the associated signal, a first indication, or some combination thereof; and
a transmitter that transmits a second indication corresponding to the time delay set, wherein the processor determines a time delay value from within the determined time delay set based on the second indication.

15. The apparatus of claim 14, wherein the downlink signal is a downlink control signal and the associated signal is a downlink data signal.

16. The apparatus of claim 15, wherein the transmitter transmits the downlink control signal and transmits the downlink data signal based on the time delay value.

17. The apparatus of claim 14, wherein the downlink signal is a downlink control signal and the associated signal is an uplink data signal.

18. The apparatus of claim 17, further comprising a receiver, wherein the transmitter transmits the downlink control signal and the receiver receives the uplink data signal based on the time delay value.

19. The apparatus of claim 14, wherein the downlink signal is a downlink data signal and the associated signal is a feedback signal response to the downlink data signal.

20. The apparatus of claim 19, further comprising a receiver, wherein the transmitter transmits the downlink data signal and the receiver receives the feedback signal based on the time delay value.

* * * * *